Figure 1:
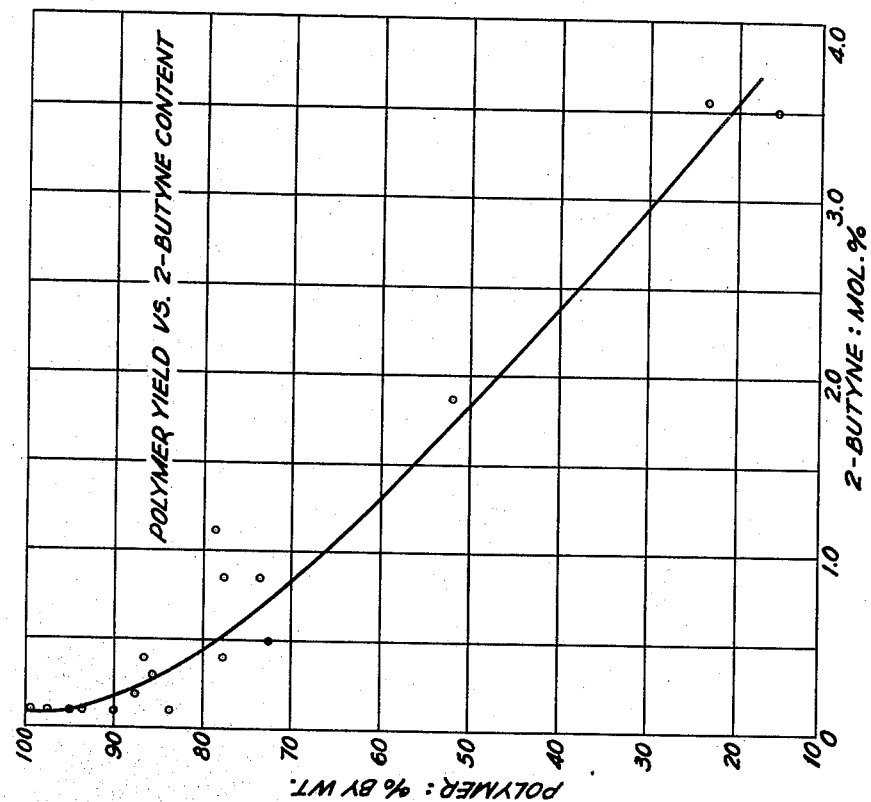

Sept. 9, 1958     A. M. HENKE ET AL     2,851,505

PURIFICATION OF ISOPRENE

Filed May 3, 1956     3 Sheets-Sheet 1

INVENTORS
ALFRED M. HENKE
VINCENT N. HURD
RODNEY E. PETERSON

BY

THEIR ATTORNEY

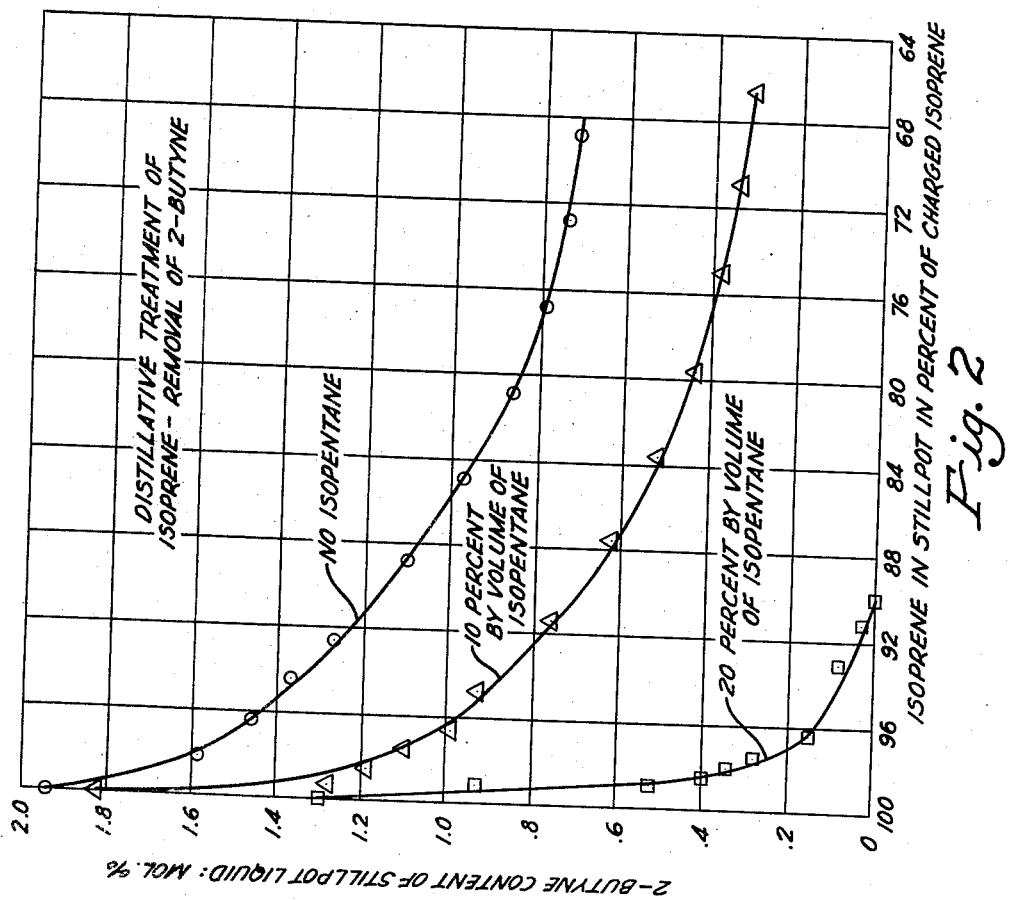

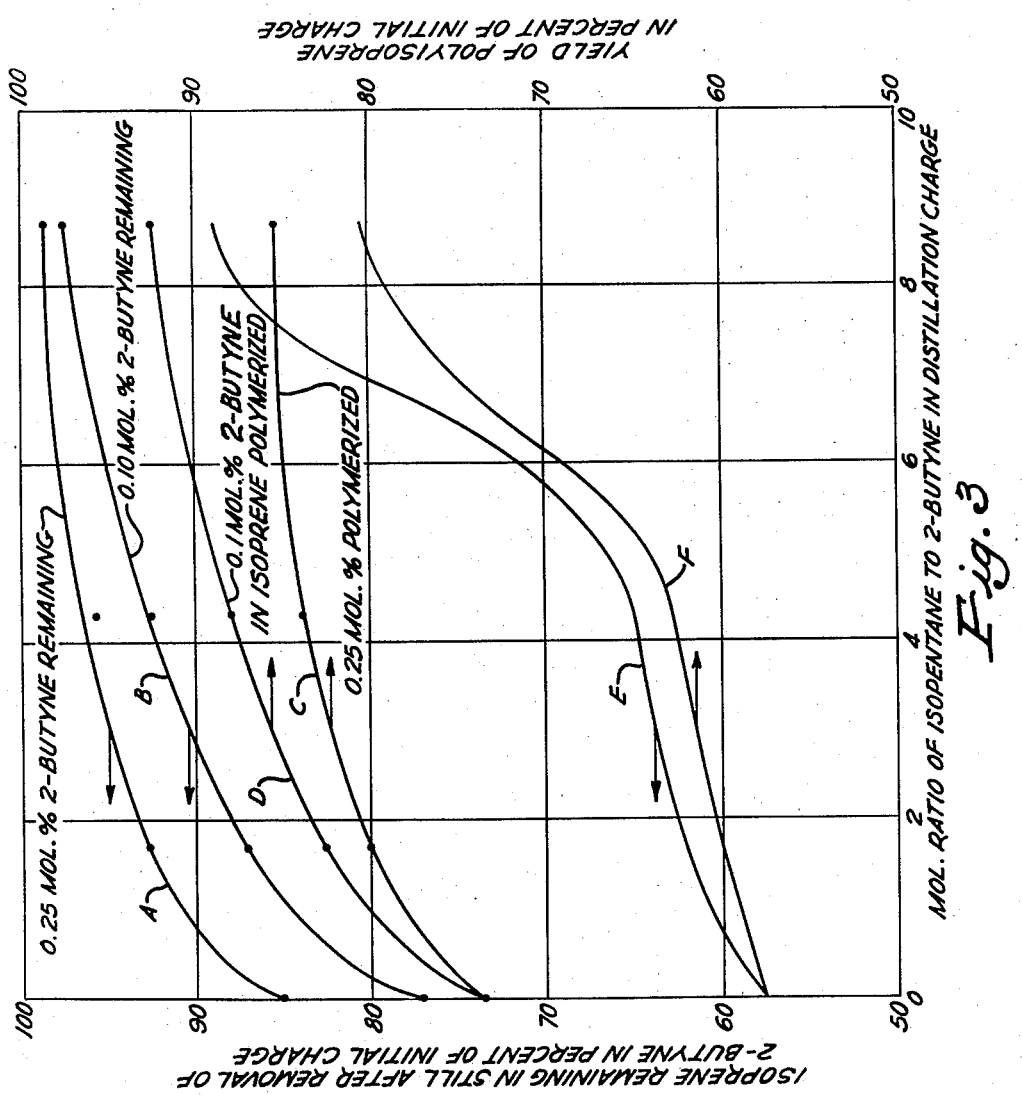

United States Patent Office 2,851,505
Patented Sept. 9, 1958

2,851,505

PURIFICATION OF ISOPRENE

Alfred M. Henke, Springdale, Vincent N. Hurd, Penn Township, Allegheny County, and Rodney E. Peterson, Oakmont, Pa., assignors to Gulf Research & Development Company, Pittsburgh, Pa., a corporation of Delaware Application May 3, 1956, Serial No. 582,563

7 Claims. (Cl. 260—681.5)

This invention relates to a process of purification of isoprene (2-methyl butadiene 1,3) and more specifically to a process of pretreating isoprene prior to the catalytic polymerization of the isoprene so as to obtain enhanced yields of a polyisoprene. The invention specifically pertains to the purification of commercially available isoprenes and the removal of polymerization inhibitors therefrom so as to prepare the isoprene for polymerization especially according to the processes described in copending application of Samuel E. Horne, Jr., Serial No. 472,786, filed December 2, 1954, for Synthetic Rubber and the Preparation Thereof, in which a synthetic hevea-type rubber having a configuration of isoprene 1,4 all-cis head-to-tail configuration is prepared, and in copending application of C. F. Gibbs et al., Serial No. 503,027, filed April 21, 1955, for Polymerization of Conjugated Polyolefins, in which, interalia, a synthetic balata-like polyisoprene having an essentially isoprene 1,4 all-trans head-to-tail structure is prepared.

The isoprene polymerization process hereinabove referred to comprises bringing monomeric isoprene into contact with a catalyst prepared by mixing a compound of a heavy metal occurring in the fourth to tenth positions in the long periods of the periodic table (see table on pages 342–343 of the 33rd edition of the Handbook of Chemistry and Physics, published 1951 by Chemical Rubber Publishing Co.) with an organo-aluminum compound of the structure

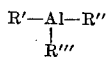

wherein R' is a hydrocarbon radical, R" is selected from the class consisting of hydrocarbon radicals and hydrogen, and R''' is selected from the class consisting of hydrocarbon radicals, oxyhydrocarbon radicals, hydrogen and halogen, the amount of said catalyst being preferably from about 0.1 to 20% by weight based on the weight of isoprene, agitating the mixture at a temperature of 0° to 80° C. for a time sufficient for the isoprene to polymerize, the catalyst complex being maintained in a molar ratio of heavy metal to aluminum of about 0.5:1 to 1.5:1 to provide the all-cis compound and of 1.5:1 to 3:1 to produce the all-trans compound. As noted in the foregoing Horne application, certain of these catalysts are described in the copending applications of Karl Ziegler et al., including Serial No. 469,059, filed November 15, 1954.

Commercially available isoprene is obtained at the present time primarily, if not solely, from petroleum conversion processes, e. g., thermal or catalytic cracking. Even though isoprene is carefully fractionated from the other petroleum-conversion products in which it is found, it still contains in the commercial form many other compounds. Of these, several strongly inhibit the foregoing polymerization process. One compound, cyclopentadiene, is readily removed by condensation with maleic anhydride according to the Diels-Alder reaction. Isoprene substantially free of cyclopentadiene can readily be distilled from the bottoms product of this reaction.

Other powerful polymerization inhibitors are present to such an extent in commercial isoprene that no unpurified isoprene available in industrial quantities has been found which will polymerize satisfactorily according to the foregoing reaction.

A powerful polymerization inhibitor present in isoprene commercially available at the present time is 2-butyne (dimethylacetylene, crotonylene). Other inhibitors that analyses indicate are present in various commercially available isoprenes are alpha acetylenes and, where the isoprene involved contains sulfur, dimethyl sulfide.

According to the present invention, we have discovered that by adding isopentane (2-methylbutane) to isoprene, fractionally distilling the resulting mixture and separating a top fraction from the remaining distillation charge, purified isoprene capable of satisfactory polymerization in the manner described above is obtained. The amount of isopentane to be used in this process will depend upon the nature and quantities of the impurities present in the isoprene treated and the distillation equipment used, but in general to obtain satisfactory results at reasonable costs an amount within the range of about 4 percent to about 30 percent of isopentane by volume of isoprene should be used.

Isopentane is a particularly effective compound for the purpose indicated because it forms an azeotrope with 2-butyne containing 62 percent isopentane which boils at 24° C. Isopentane also forms azeotropes with dimethyl sulfide and with alpha acetylenes. The azeotrope of isopentane with dimethyl sulfide contains 82 percent isopentane and boils at 27.3° C., whereas methyl sulfide alone boils at 37.3° C. A typical alpha acetylene, 2-methyl-1-buten-3-yne (isopropenyl acetylene) forms an azeotrope with isopentane containing 77 percent isopentane which boils at 25.6° C. whereas the alpha acetylene alone boils at 32.5° C. Even in the case of an inhibitor which does not form an azeotrope with isopentane, the use of isopentane is effective to aid substantially in the removal of this inhibitor.

Isopentane also has the advantage, as shown by recent research work, of not forming azeotropes with isoprene. Moreover, it has been discovered that isopentane does not inhibit the later polymerization of the isoprene by the process previously described and therefore satisfactorily may become a part of the solvent medium in which the polymerization is carried out.

As indicated above, the invention in its broad scope is concerned with the purification of commercial isoprene from various sources. However, since the isoprene presently available in relatively large quantities is a product that contains an amount of 2-butyne which will effectively inhibit the later polymerization of the isoprene, most of the following detailed description will be concerned with the purification of an isoprene containing this impurity alone or together with other polymerization inhibitors. Inasmuch as we prefer to employ an amount of isopentane substantially in excess of the amount required to form the isopentane-2-butyne azeotrope, as discussed more fully below, the process of the invention will ordinarily be effective to remove or substantially reduce the concentration of other polymerization inhibitors.

The objective of the invention is of course to prepare the desired purified isoprene in maximum yields using the most economical fractionating procedure. In general, the content of powerful polymerization inhibitors such as the acetylenes, including 2-butyne, and dimethyl sulfide should be reduced to below 0.5 volume percent and preferably less than 0.1 percent while recovering at least 80 percent and preferably more than 90 percent of the original isoprene charged. When a distillation column having a large number of theoretical plates is employed, satisfactory results can be obtained by adding isopentane to the isoprene in relatively small amounts such as, for example, 4 to 8 volume percent, which in the case of the type of isoprene generally available will be amount necessary to form azeotropes with the impurities in question. On the other hand, if a distillation column having a lesser number of plates, such as 20 to 25 theoretical plates, is employed, it is preferred to add isopentane to the isoprene in an amount equal to at least 10 percent by volume. Ordinarily when using a distillation column of this type, we prefer to add 20 percent by volume of isopentane or more. When operating as described, the purified isoprene obtained can be polymerized to provide polymer yields based on the isoprene charged to the distillation column as high as 90 odd percent compared to maximum yields of about 75 percent when distillation fractionation only is employed, even though almost exhaustive distillation techniques are used.

Isopentane that has been employed in a distillation operation in accordance with the invention can be regenerated for reuse in the process by well-known procedures. The used isopentane can be purified successfully by conventional mild hydrogenation processes employed for the removal of acetylenic compounds from less unsaturated hydrocarbons. When using a process of this type, the isopentane containing the acetylenic impurities is passed at elevated temperatures and pressures with hydrogen in contact with a catalyst comprising a metal such as a nickel, palladium or platinum deposited on a support such as alumina. Under these conditions the acetylenic compounds are hydrogenated and can be efficiently removed from the isopentane in a stripping column. Also, the acetylenic compounds in the isopentane can be removed by means of selective solvents or by contacting isopentane with adsorbents such as adsorbent clays.

Isoprene purified as described above is employed for polymerization in the following manner. It is brought into contact with a catalyst as described above in the presence of a suitable hydrocarbon solvent and in the absence of oxidizing materials such as oxygen, and materials containing active hydrogen atoms such as acids or alcohols. As described in the copending Horne application, the temperature or pressure of the reaction is not critical, it being possible to employ subatmospheric pressures and conveniently ambient or room temperatures. It is preferred to introduce liquid isoprene into a colloidal dispersion of the catalyst in the hydrocarbon solvent under pressure of nitrogen to maintain the mixture at a temperature between about 0 and 80° C. and preferably between about 20 and 50° C. The reaction pattern may vary between thirty minutes and ten hours and generally between one and five hours. The volume of hydrocarbon solvent is preferably between about 1 and 30 times the volume of hydrocarbon monomer present.

The polymer product may be present either in dispersion or, sometimes, in solution in the hydrocarbon reaction medium. The polymer can be separated from the reaction mixture by treatment with methanol to precipitate the polymer, which is then separated from the reaction mixture and may then be washed with additional quantities of methanol.

Figure 4:
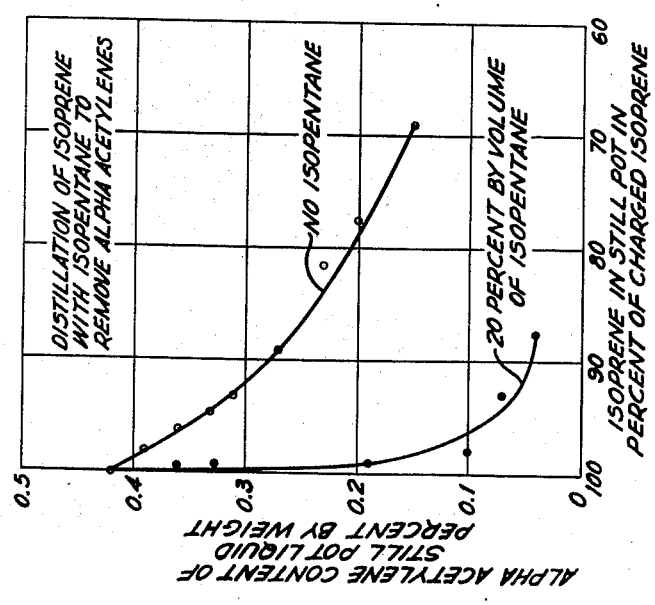

In the accompanying drawings provided for the purpose of illustrating the invention, Fig. 1 shows the relationship of the concentration of 2-butyne in the isoprene to the yield of polyisoprene obtainable from such isoprene, Fig. 2 shows the quantities of isoprene of the indicated purity recovered in the distillation of a commercial isoprene when adding different amounts of isopentane to the isoprene prior to distillation, Fig. 3 shows the relationship of the mol ratio of isopentane per mol of 2-butyne that is contained in the so-treated isoprene with the yield of isoprene recoverable substantially free of 2-butyne and the yield of polyisoprene based on the weight of commercial-quality isoprene, and Fig. 4 shows the reduction in the concentration of other polymerization inhibitors, alpha acetylenes, with distillation of a commercial isoprene containing 0.42 weight percent of alpha acetylenes in the presence of isopentane.

Referring now to Fig. 1, it is shown there how powerful 2-butyne is in reducing the yield of polyisoprene. It is clear from the curve of Fig. 1 that the 2-butyne content must be reduced to less than about 0.5 mol percent and preferably to less than about 0.1 mol percent in order to ensure a practicable yield of polyisoprene.

In some instances, as in the preparation of a synthetic balata or synthetic hevea-type rubber to fit a very specific need, it may be necessary to remove substantially all of the 2-butyne from the isoprene. The 2-butyne content cannot be reduced to substantially zero without the use of isopentane unless a large amount of the isoprene charged to the still is fractionally distilled therefrom using exceptionally intensive fractional distillation procedures.

Fig. 2 illustrates the results obtained using a 20 plate distillation column (calculated at total reflux) with an operating reflux ratio of 25:1. In this type of operation, the results shown indicate that in order to obtain a good yield of the isoprene charged to the column, with a low content of 2-butyne, at least 20 percent isopentane by volume of the charged isoprene should be used. This figure also shows that when using this column and reflux ratio and no isopentane, the isoprene in the still pot contains more than 0.7 mol percent of 2-butyne even after 30 percent of the isoprene has been taken overhead.

In Fig. 3 the yields both of purified isoprene and of polyisoprene are reported for distillations in a 90 plate column and in a 20 plate column (calculated at total refluxes), the distillation in the 90 plate column being performed at a 50:1 reflux ratio and in the 20 plate column at a 25:1 reflux ratio.

The difference also, between two purification processes is shown. In one of these processes, after the isopentane has been added, distillation of the top fraction to be discarded is continued only until 0.25 mol percent of 2-butyne remains in the isoprene in the still. This not entirely pure isoprene was then polymerized. In the other process, fractional distillation was continued until the 2-butyne content of the still pot was reduced to 0.10 mol percent. This distillation residue was then polymerized. It was found that better yields were obtained when the second procedure was followed.

In Fig. 3, curve A shows the yields of isoprene remaining in the still after the removal of 2-butyne at various mol ratios of isopentane to 2-butyne in the distillation charge. It is seen that 2 mols per mol of 2-butyne added to the distillation charge will increase the yield of isoprene having not more than 0.25 mol percent of 2-butyne from about 85 percent up to 93 percent.

Curve B shows the yields of isoprene having not more than 0.10 mol percent of 2-butyne that are obtainable by the use of an increasing mol ratio of isopentane to 2-butyne in the fractional distillation of isoprene containing the 2-butyne. Here it can be seen, for example, that the use of 4 mols of isopentane per mol of 2-butyne will increase the yield of substantially 2-butyne-free isoprene (containing 0.10 mol percent of 2-butyne or less) from 77 percent to 92 percent.

Curves C and D illustrate, respectively, by reference to the right hand ordinate of the curves of Fig. 3, the yields of polymer in percent of isoprene charged to the still that are obtained at various mol ratios of isopentane to 2-butyne when the procedure of curve A, reduction to 0.25 mol percent of 2-butyne and the procedure of curve B, reduction to 0.10 mol percent of 2-butyne, are employed. The notable effect there illustrated is that it is clearly preferable to reduce the 2-butyne content to 0.10 mol percent or better in order to ensure higher yields of polyisoprene. In addition, of course, the polyisoprene from the substantially pure isoprene will display improved characteristics. In either case substantial improvement is obtained by the use of isopentane and it can be seen that 90 percent yields are obtained if more than 8 mols of isopentane per mol of 2-butyne are employed according to the preferred procedure.

Curves E and F illustrate the pronounced effect shown by the use of isopentane both in providing higher yields of 2-butyne-free isoprene of polymer when a still of less precision requirements is employed.

Curve E illustrates the increase in yield of isoprene containing less than 0.10 mol percent of 2-butyne obtainable with increasing quantities of isopentane and marks the rapid increase in yield obtainable when the amount of isopentane added is increased from about 5 mols to more than 8 mols per mol of 2-butyne.

The same abrupt increase is shown in curve F which illustrates the increase in yield of polymer with the addition of increasing amounts of isopentane to isoprene prior to the purification-distillation step. Here again the yield sharply increases from about 65 percent to about 79 percent of the crude isoprene when the amount of isopentane that is added is increased from about 5 mols to more than 8 mols per mol of 2-butyne in the crude isoprene.

Fig. 4 shows that by using 20 percent by volume, based on crude isoprene, of isopentane, a yield of greater than 90 percent of substantially alpha acetylene-free isoprene (i. e., isoprene containing less than 0.1 weight percent of the alpha acetylenes) can be obtained.

In addition to the numerous examples illustrated by the above-described curves, the following specific examples illustrate in more detail operation according to the present invention.

EXAMPLE I

Commercial isoprene having the composition shown in the following Table I was fractionally distilled in the presence of isopentane and maleic anhydride:

*Table 1*

*Composition of a commercial isoprene*

| Compound: | Mol or vol. percent |
|---|---|
| Isoprene | 94.80 |
| 2-butyne | 2.50 |
| Cyclopentadiene | 0.54 |
| Pentadienes | 1.01 |
| Alpha acetylenes | 0.40 |
| Miscellaneous olefins | 0.54 |

The charge composition in percent by weight was as follows: commercial-grade isoprene 88.9 percent, isopentane 8.9 percent, and maleic anhydride 2.2 percent. The mol ratio of isopentane to 2-butyne was 4:1. Distillation was performed in a 25 gallon-capacity precision still having a packed column equivalent to about 60 theoretical plates, a reflux ratio of 50 being employed during distillation. Removal of an overhead fraction was continued until substantially complete removal of 2-butyne and also of isopentane was accomplished, even though the isopentane does not interfere with polymerization. An average yield of 88 weight percent of polyisoprene was obtained in five runs in which a total of about 132 gallons of commercial isoprene were treated.

EXAMPLE II

Commercial isoprene having the composition reported in Table I was fractionally distilled in a 150 gallon-capacity batch still, having a packed column equivalent to about 17 theoretical plates, in the presence of isopentane and maleic anhydride. The charge composition in percent by weight was as follows: commercial grade isoprene 78.3 percent, isopentane 19.6 percent, and maleic anhydride 2.1 percent. The mol ratio of isopentane to 2-butyne was 11:1. This corresponds to about 27.5 percent of isopentane by volume of the isoprene. The reflux ratio was 45. Removal of an overhead fraction was continued until substantially complete removal of 2-butyne and isopentane was accomplished. An average yield of 89 weight percent of polyisoprene was obtained in seven runs in which a total of 795 gallons of commercial isoprene were treated.

EXAMPLE III

This is a specific example of a polymerization process for converting isoprene purified in accordance with the present invention to polyisoprene. The isoprene employed had been purified in a ninety-plate fractionating column in the presence of isopentane (10 percent by volume) and maleic anhydride. Analysis of a sample indicated that the purified isoprene contained 99.1 percent isoprene, 0.6 percent isoprene isomers and 0.3 percent 2-butyne. Five batches of this purified isoprene, each containing 73.5 milliliters were polymerized in the following manner. Each portion was placed in a clean oxygen-free quart flask together with 512 milliliters of benzene (which had been distilled over sodium), 2.48 milliliters of triisobutyl aluminum and 1.1 milliliters of titanium tetrachloride. Oxygen was excluded from the system at all times by a nitrogen purge. The flasks were placed in a 50° C. constant temperature bath and continuously rotated end over end at 28 R. P. M. for four hours at which time methanol was added to stop the reaction. The average yield of polyisoprene rubber for the five batches was 90 percent based on the isoprene charged.

From all of the foregoing it will be seen that the present invention provides a valuable process for purifying commercial isoprene whereby the isoprene can be employed for polymerization by the process disclosed to produce high yields of polymer. Isoprene is a valuable product and therefore the distillation will ordinarily be carried out so as to recover the maximum amount of purified isoprene even though this may require the use of relatively large quantities of isopentane. Satisfactory results can be obtained by using as little as about two mols of isopentane for each mol of a polymerization inhibitor boiling at a lower temperature than isoprene when using a distillation column having a large number of plates, which in the case of the normal commercial isoprene would be equal to about 4 volume percent of the isoprene. In less efficient, and less expensive, equipment about 10 to about 20 volume percent or more of isopentane should be used. However, the use of more than about 30 percent if isopentane is not necessary in any case and should not be used as this increases the cost of the process.

Where the impure isoprene contains 2-butyne or other polymerization inhibitors that form azeotropes with isopentane, the isopentane should be added in an amount at least adapted to form such azeotropes, and preferably in substantial excess of this amount, for example at least twice this amount. In any case, less than 4 volume percent of isopentane would not ordinarily be used as it is desirable to reduce the impurity content to a minimum without using the most precise distillation equipment.

Obviously many modifications and variations of the invention as hereinabove set forth may be made without departing from the spirit and scope thereof but only such limitations should be imposed as are indicated in the appended claims.

We claim:

1. A process of purifying isoprene that contains polymerization inhibitors which comprises adding isopentane to the impure isoprene and fractionally distilling the resulting mixture to separate therefrom a top fraction containing such quantity of such inhibitors that the topped remainder of said impure isoprene is effectively polymerizable.

2. A process of purifying isoprene that contains polymerization inhibitors which comprises adding isopentane to the impure isoprene, fractionally distilling the resulting mixture and removing a top fraction until the topped remaining isoprene contains less than 0.5 mol percent of such inhibitors.

3. A process of purifying isoprene that contains polymerization inhibitors which comprises adding isopentane to the impure isoprene in excess of the amount necessary to form azeotropes with such inhibitors, fractionally distilling the resulting mixture and removing therefrom a top fraction until the topped remainder of said impure isoprene contains such quantity of such inhibitors that said topped remainder is effectively polymerizable.

4. A process of purifying isoprene that contains polymerization inhibitors which comprises adding isopentane to the impure isoprene in an amount equal to about 4 to about 30 percent by volume of said impure isoprene, fractionally distilling the resulting mixture and separating therefrom a top fraction containing such quantity of such inhibitors that the topped remainder of said impure isoprene is effectively polymerizable.

5. A process of purifying isoprene that contains polymerization inhibitors but is substantially free of cyclopentadiene to adapt such impure isoprene for effective polymerization in the presence of a catalyst complex consisting of a mixture of an organo aluminum compound and a salt of a metal selected from the group consisting of the metals occurring in the fourth to the tenth positions in the long periods of the periodic table, which process comprises adding isopentane to the impure isoprene in an amount equal to about 10 to about 30 percent by volume of said impure isoprene, fractionally distilling the resulting mixture and separating therefrom a top fraction containing such quantity of such inhibitors that the topped remainder of said impure isoprene is effectively polymerizable in the presence of such complex.

6. A process of purifying isoprene that contains polymerization inhibitors, including 2-butyne, which comprises adding to the impure isoprene isopentane in an amount equal to about 4 to about 20 percent by volume of said impure isoprene, fractionally distilling the resulting mixture and separating therefrom a top fraction containing such quantity of such inhibitors that the topped remainder of said impure isoprene contains not more than 0.1 mol percent of such inhibitors.

7. A process of purifying isoprene that contains a polymerization retarding amount of at least one polymerization inhibitor selected from the group consisting of 2-butyne, dimethyl sulfide and alpha acetylenes but is substantially free of cyclopentadiene which comprises adding isopentane to the impure isoprene in an amount equal to about 4 to about 30 percent by volume of said impure isoprene, fractionally distilling the resulting mixture and separating as bottoms an isoprene product having a reduced content of said inhibitors.

No references cited.